United States Patent [19]
Westwood, III

[11] Patent Number: 4,586,284
[45] Date of Patent: May 6, 1986

[54] FISHING LINE SIGNAL

[76] Inventor: Samuel M. Westwood, III, 2005 Linden St., Bethlehem, Pa. 18017

[21] Appl. No.: 630,431

[22] Filed: Jul. 12, 1984

[51] Int. Cl.⁴ ............................................. A01K 97/12
[52] U.S. Cl. ........................................ 43/17; 43/17.1; 43/17.5
[58] Field of Search ................... 43/17, 16, 17.1, 17.5

[56] References Cited

U.S. PATENT DOCUMENTS

| | | | |
|---|---|---|---|
| 2,446,427 | 8/1948 | Linder | 43/17 |
| 2,741,055 | 4/1956 | Weber | 43/17 |
| 3,037,317 | 6/1962 | Morrison | 43/17 |
| 3,228,135 | 1/1966 | Kricksfeld | 43/17 |
| 3,702,513 | 11/1972 | Watts | 43/17 |
| 3,798,630 | 3/1974 | Grosthwait | 43/17 |
| 3,835,462 | 9/1974 | Periman | 43/17 |
| 3,878,635 | 4/1975 | Trosper | 43/17 |
| 3,913,255 | 10/1975 | Fillmen | 43/17 |
| 3,959,910 | 6/1976 | Montgomery | 43/17 |
| 4,020,578 | 5/1977 | Hope | 43/17 |
| 4,399,631 | 8/1983 | Smith | 43/17 |

Primary Examiner—Nicholas P. Godici
Assistant Examiner—K. Rowan
Attorney, Agent, or Firm—Harvey B. Jacobson

[57] ABSTRACT

A fishing line signalling device for attachment to a fishing rod and receiving the fishing line in a manner that a visual or audible alarm or both will be activated when the fish strikes or takes the bait thereby alerting the person using the fishing rod to the fact that a fish has taken the bait or hook. The fishing line signal is battery operated, provided with a switch to selectively actuate either or both the visual and audible signals and is adaptable to any size fishing rod, used with any type of reel and allows a person to fish with more than one rod at a time and is suitable for trolling, still water fishing, night fishing, ice fishing and fresh or salt water fishing. The signalling device includes a switch arm that frictionally grips the fishing line and is spring biased with an adjustment device varying the sensitivity of the device so that when the fishing line is pulled, it is removed from the signalling device so that the switch arm can move to close an electrical circuit to operate a buzzer or light or both.

10 Claims, 7 Drawing Figures

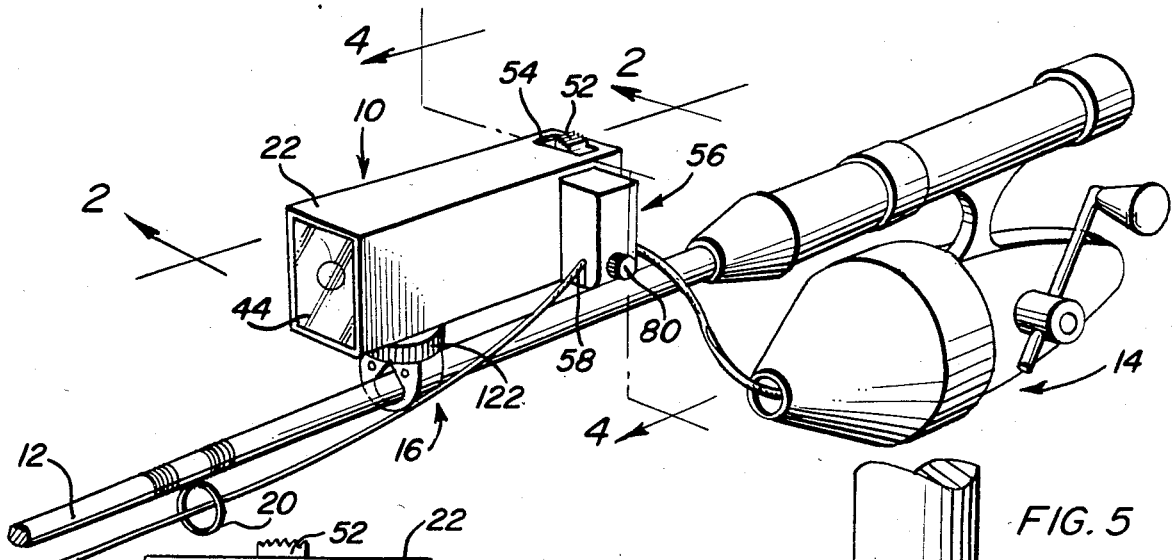
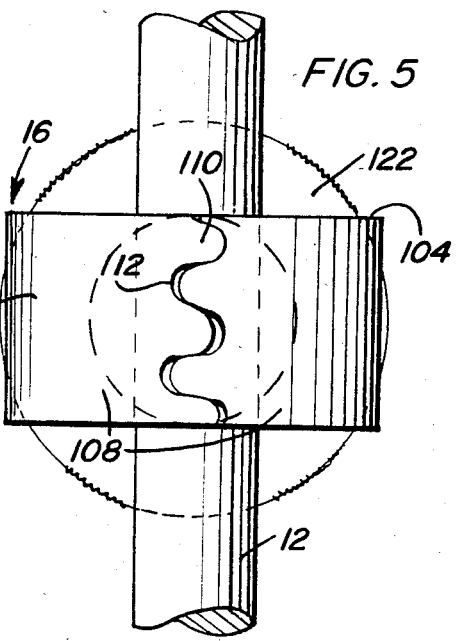
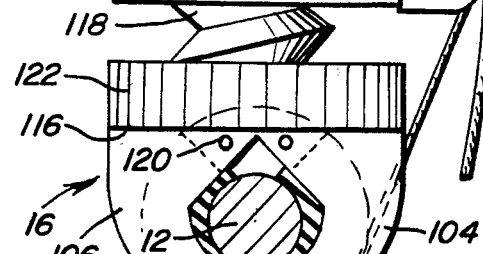
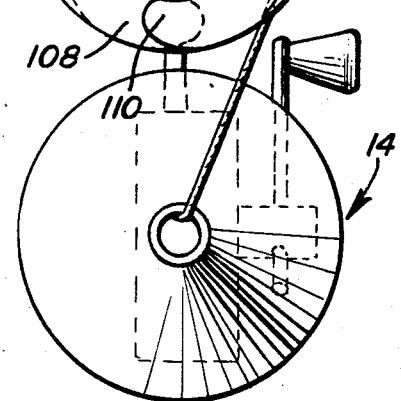
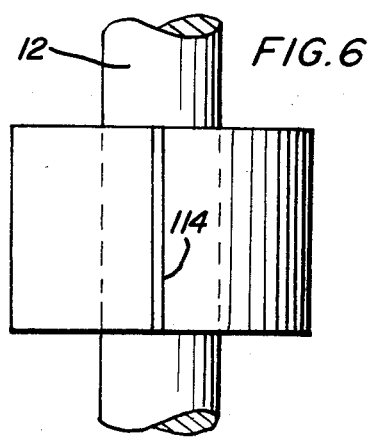

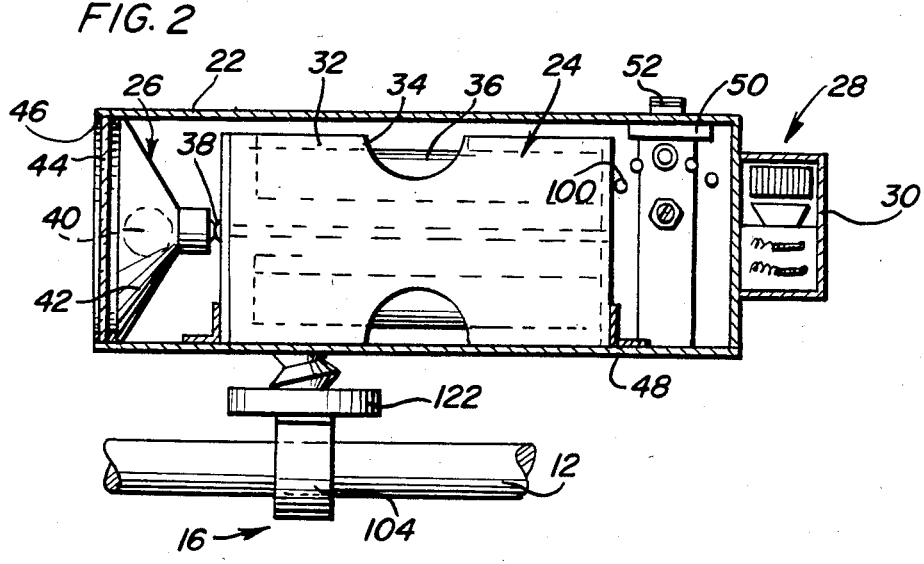
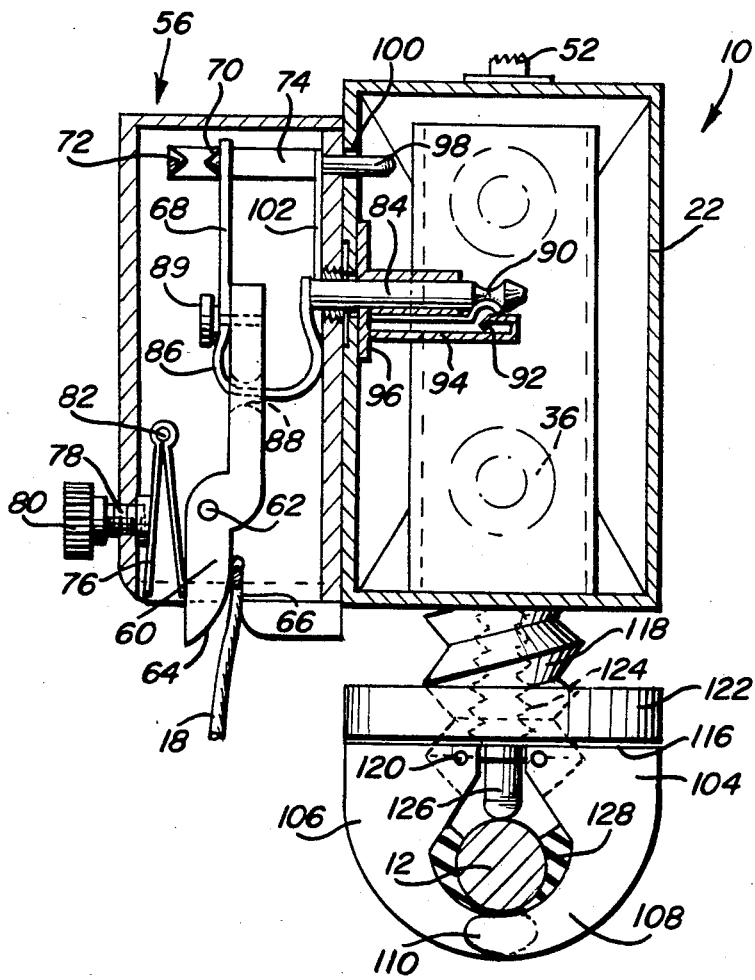
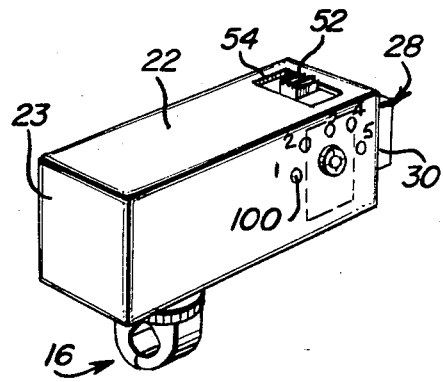

FISHING LINE SIGNAL

BACKGROUND OF THE INVENTION

1. Field of the Invention

The present invention generally relates to a fishing line signal which is easily installed on various types and sizes of fishing rods and adapted for use with various types of fishing line reels with the signalling device receiving and engaging the fishing line in a manner that the fishing line will be pulled out of the signalling device when a fish strikes the hook or takes the bait for actuating the signalling device. The signalling device includes a visual signal in the form of a light and/or an audible signal in the form of a buzzer or both together with a switch for selectively actuating a signal to enable a person using the device to be alerted to the fact that a fish has struck the hook or bait.

2. Description of the Prior Art

Various devices have been provided in association with fishing rods and lines to signal that a fish has struck the hook or taken the bait. Such devices utilize batteries as a power source and may include an audible alarm or a visual alarm and a structure for closing a switch in a circuit to actuate the alarm when tension is exerted on the fishing line and the fishing line moved in a linear manner as occurs when a fish strikes the hook or takes the bait. The following U.S. Patents are relevant to this type of alarm device:

| | |
|---|---|
| 2,814,900 | Dec. 3, 1957 |
| 2,978,828 | April 11, 1961 |
| 2,986,835 | June 6, 1961 |
| 3,103,759 | Sept. 17, 1963 |

The above listed patents contain some of the features that are common to most all fishing line signalling devices but are not particularly pertinent to the present invention.

SUMMARY OF THE INVENTION

An object of the present invention is to provide a fishing line signal that alerts the person using the fishing rod by actuating either a buzzer-type audible signal or a light-type visual signal or both when a fish strikes the hook or takes the bait and moves the fishing line in a linear manner.

Another object of the invention is to provide a fishing line signal in accordance with the preceding object in which a selector switch is provided to enable the user to select which type of signal is to be actuated or to enable both signals to be actuated.

A further object of the invention is to provide a fishing line signal in accordance with the preceding objects utilizing a sensitivity adjustment for a switch mechanism which responds to the presence or absence of a fishing line positioned under a spring biased member so that when the line is moved in a linear manner or tensioned, it will be pulled out from under the spring biased member to enable actuation of a switch to actuate the alarm thereby enabling the sensitivity of the alarm device to be adjusted to compensate for naturally occurring tension forces that might be exerted on the fishing line thereby reducing the possibility of false signals being rendered.

Still another object of the invention is to provide a fishing line signal which is provided with a simple but unique clamp structure to enable it to be attached in various positions with respect to the fishing rod and various types of reels and mounted on various types of fishing rods in adjusted position so that the device may be used during various types of fishing and enables a person to fish with more than one rod at a time.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the fishing line signal of the present invention attached to a conventional fishing rod with a spinning reel supported below the rod.

FIG. 2 is a longitudinal sectional view taken along section line 2—2 of FIG. 1 illustrating the association of the components of the signalling device.

FIG. 3 is an end elevational view of the fishing line signal.

FIG. 4 is a transverse sectional view, on an enlarged scale, taken substantially upon a plane passing along section line 4—4 on FIG. 1 illustrating the specific structural details of the invention.

FIG. 5 is a bottom plan view of the mounting clamp structure.

FIG. 6 is a bottom plan view of a modified form of mounting clamp structure.

FIG. 7 is a perspective view of the housing of the fishing line signal with the switch assembly removed therefrom illustrating the locating apertures around the aperture receiving the male jack component on the switch assembly.

DESCRIPTION OF THE PREFERRED EMBODIMENTS

Referring now specifically to the drawings, the fishing line signal of the present invention is generally designated by reference numeral 10 and is mounted on a fishing rod 12 adjacent the reel 14 by a clamp bracket generally designated by numeral 16 with the signalling device 10 receiving the fishing line 18 which extends through the usual guide eyes or loops 20 from the reel 14 to the outer end of the rod with a hook, lure or other bait attached to the end of the line in the usual manner. The fishing line signal may be utilized with various types and sizes of fishing rods 12 and with various types of reels including a spinning reel or a casting reel. When the device is used with a spinning reel 14, the signalling device 10 is located on top of or above the fishing rod 12 as illustrated but when used with a casting reel, the fishing line signal 10 is preferably oriented below the rod 12.

The fishing line signal 10 includes a main housing 22 which receives a battery assembly generally designated by numeral 24 and includes a visual signal 26 in the form of a light at one end of the housing and an audible signal 28 in the form of a buzzer in an extension 30 on the other end of the housing 22 which is preferably elongated and rectangular or square in cross sectional configuration.

The battery assembly 24 is conventional in construction in that it employs a casing or housing 32 with notches 34 enabling access to the central portion of a plurality of elongated cylindrical batteries 36 which are oriented in a manner that they are electrically connected with a contact 38 engaging the base of a light bulb 40 supported in a reflector structure 42 inwardly of a transparent lens 44 mounted in the housing 22 in a waterproof manner by a seal and flange assembly 46, all of which represents conventional light structure. The battery assembly 24 may be retained in position by suitable anchoring devices 48 and one wall of the housing 22 may be removed, either slidably or pivotally, to enable access to and thus replacement of the batteries 36 when necessary.

At one end of the housing 22, adjacent the extension 30, a switch body 50 is provided having a slide switch button 52 projecting upwardly through an opening 54 in the housing 22. The switch body 50 including the switch incorporated therein is electrically connected with the batteries 36, the light or visual signal 26 and the buzzer or audible signal 28 so that the slide switch can provide an electrical circuit to either of the signals or both of them as determined by the user of the signalling device.

Mounted alongside of and supported from the housing 22 is a switch assembly 56 which includes a vertical slot 58 in its lower edge receiving the fishing line 18 therein. A switch arm 60 is pivotally supported in the switch assembly 56 for pivotal movement about a pivot pin 62 with the lower end of the switch arm 60 including an outwardly curved jaw 64 which engages one surface of the line and frictionally clamps it against a clamping surface 66 forming the inner edge of the slot 58. The switch arm 60 includes a contact arm 68 on the end thereof opposite from the jaw 64 with a contact member 70 being mounted on the arm 68 for engagement with and separation from a contact 72 carried on a stationary arm 74. When the fishing line 18 is disposed between the jaw 64 and the gripping surface 66, the switch arm 60 is pivoted about pivot point 62 so that the contact 70 will be spaced from the contact 72 as illustrated in FIG. 4 thereby interrupting a circuit that is normally closed when the contacts 70 and 72 are in contact with each other. A generally reversely folded leaf spring 76 has one leaf engaging the switch arm 60 in opposed relation to the jaw 64 below the pivot pin 62 as illustrated in FIG. 4 and the other leaf engaged by an adjustment screw 78 having a knurled knob 80 on the outer end thereof. The bight portion of the reversely folded spring 76 is mounted on a pin 82 above the screw 78 illustrated in FIG. 4 so that by adjusting the screw 78 by turning the knob 80, the force exerted by the spring 76 onto the jaw 64 can be varied thereby varying the frictional engagement between the fishing line 18 and the jaw 64 and gripping surface 66 thereby varying the force required to pull the fishing line 18 from between the jaw 64 and the surface 66 thereby varying the sensitivity of the switch assembly 56 inasmuch as movement of the fishing line 18 out of the area between the jaws 64 and 66 permits the spring 76 to close the contacts 70 and 72 by moving the contact 70 into engagement with the contact 72.

The switch assembly 56 includes a male component 84 of a jack that is rigid therewith and is connected to the contact arm 68 through a flexible wire 86 which extends through an opening 88 in the switch member 60 and is secured to the conductive contact arm 68 by a screw threaded terminal connector 89. The free end of the male component 84 of the jack includes a peripheral recess or groove 90 which interlockingly engages a projecting detent 92 on the female component 94 of the jack which is secured to the wall of the housing 22 as at 96 and electrically connected to the battery assembly 24. The stationary contact 72 is mounted on arm 74 having a locating stud 98 on the inner end thereof for insertion into one of a series of circumferentially arranged holes 100. Also, the arm 74 includes a conductive member 102 which extends along the interior of the switch assembly housing and is connected to the female component 94 of the jack which in turn is electrically connected to the battery assembly 24 so that when the male component 84 and female component 94 of the jack are assembled in the manner illustrated in FIG. 4, the contacts 70 and 72 will complete the circuit to either or both of the signalling devices depending upon the position of switch button 52 when the fishing line 18 is not between the jaw 64 and gripping surface 66. When the fishing line 18 is between the jaw 64 and the gripping surface 66, the contacts 70 and 72 will be spaced from each other thereby interrupting the circuit to the alarm devices regardless of the position of switch button 52.

As illustrated in FIGS. 2 and 7, the apertures 100 are arranged in circumferentially spaced relation about the aperture which receives the male component 84 of the jack so that the slot 58, jaw 64 and gripping surface 66 can be oriented in one of five positions to position the gripping area for the fishing line 18 in optimum relation to the fishing line. FIG. 7 also shows an optional arrangement without a light in which the lens 44 is replaced by a solid opaque end wall 23 on housing 22.

The clamp bracket 16 for mounting the fishing line signal 10 on the fishing rod 12 includes a pair of gripping jaws 104 and 106 which have inturned outer ends 108 with the free outer ends thereof being provided with alternate teeth and recesses 110 and 112 as illustrated in FIG. 5 for gripping larger rods 12 and straight edges 114 as illustrated in FIG. 6 for gripping smaller rods. The inner ends of the jaws 104 and 106 are flat as at 116 with the flat surfaces 116 being perpendicular to the radius of the fishing rod 12 which extends between the inner ends of the jaws 104 and 106. The inner facing edges of the jaws 104 and 106 are pivotally attached to a mounting stud 118 by pivot pins 120 which parallel the rod 12 and enable the jaws 104 and 106 to swing inwardly and outwardly toward each other. The mounting stud 118 is externally threaded with large threads which are screw threadedly engaged by an actuating nut 122 which screws down against the flat surfaces 116 of the jaws 104 and 106 thereby moving the ends 108 of the jaws 104 and 106 toward each other for securing the jaws to the rod 12. The interior of the mounting stud 118 is also hollow and internally threaded as at 124 for screw threadedly receiving an abutment rod 126 for engagement with the surface of the rod 12 opposed to the free ends 108 of the jaws 104 and 106 to securely clamp the bracket 16 to the fishing rod 12. As illustrated, the interior surfaces of the jaws 104 and 108 where they engage the rod 102 are provided with a rubber insert 128 for increasing the gripping ability of the jaws. The rubber inserts may be provided with a projection received in a groove in the inner surface of the jaws 104 and 106 to facilitate mounting of the rubber inserts 128 into the jaws 104 and 106.

The housing 22 may be constructed in a manner to receive a battery assembly consisting of two 1.5 volt batteries, four 1.5 volt batteries, a 9 volt battery or any other suitable battery arrangement. The internal wiring for connecting the battery assembly to the bulb, buzzer, selector switch and jack plug are not shown since they represent conventional wiring arrangements to provide a completion of a circuit when the switch button 52 is properly positioned and the switch assembly 56 is properly positioned and the fishing line 18 is pulled from between the jaw 64 and the gripping surfaces 66.

The fishing line signal may be used with a spinning rod and reel with the bail in either open or closed position or with a casting rod and reel in which event the fishing line signal will be mounted underneath the rod and out of the way of the fishing line since the line runs along the top of the rod. When the fishing line signal 10 is mounted below the rod, the switch assembly 56 will be on the right side of the rod. In this position, the switch assembly may be positioned by inserting the stay stud 98 into the proper aperture 100 so that the gripping jaw 64 and gripping surface 66 will face upwardly to receive the fishing line. Various of the holes 100 may be used for the stay stud to provide for an easier release of the fishing line when there is a more direct pull without touching the tension adjustment screw 78. If it is desired that the light shine upon the reel when it is activated by a fish bite and not towards the front of the rod, the fishing line signal may be merely reversed on the rod so that it shines backwards. When the device is reversed, the line holding switch assembly is now on the opposite side of the rod and the position of the line holding switch assembly must be adjusted to provide proper positioning of the gripping jaw 64 and surface 66 for proper release of the fishing line when it is pulled in a linear direction. There are five stay stud holes 100 to allow five different positions of the switch assembly 56. These five different positions change the angle of the line holding jaw surface 64 and gripping surface 66 which allows the line to be pulled from between these surfaces more easily without touching the tension adjustment screw. For example, if the gripping surfaces 64 and 66 are facing the front of the housing 22 with the line being oriented in a generally perpendicular relation to the rod 12, this would allow the line to be pulled out more easily than if the gripping surfaces paralleled the rod 12 since there would be a more direct pull on the fishing line 18.

The fishing line signal or rod tender alerts the person using the device that a fish has taken the bait or struck the hook by the buzzer sounding or the light going on or both depending upon the position of the switch button 52. This renders the device suitable for use when trolling, still water fishing, night fishing, ice fishing, fresh water fishing or salt water fishing and enables a person to fish with more than one rod at a time. The signalling device is adaptable for use with any size rod and with any type of reel with the adjustment screw being provided to vary the sensitivity of the device and the adjustable switch assembly being provided to vary the relationship between the gripping surfaces and the fishing line to vary the force required to pull the fishing line from between the gripping surfaces without adjusting the adjustment screw. When fishing with more than one rod at night or when ice fishing and the like, the buzzer will alert a person that a strike exists and the light indicates which rod and hook assembly has received the strike thereby enhancing the possibility of landing the fish. The fishing line signal may be easily attached to and removed from the fishing rod without any modification whatsoever to the fishing rod, line or reel and the removability feature enables the signalling device to be used as a flashlight.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A fishing line signal comprising a housing, means mounting the housing on a fishing rod, signal producing means supported by said housing and a switch assembly mounted on said housing in adjustable position and grippingly receiving a fishing line to interrupt a circuit to the signal producing means when the fishing line is positioned in the switch assembly and completing a circuit to the signal producing means when the fishing line is pulled from the switch assembly and means mounting the switch assembly adjustably on the housing to position it in optimum position for receiving the fishing line and varying the pulling force required on the line to remove the fishing line from the switch assembly, said signal producing means including a selector switch to actuate a signal when the circuit to the signal producing means is completed, said housing including a battery assembly for providing a source of electrical energy to operate the signal producing means, said switch assembly including a stationary jaw with a gripping surface and a movable jaw with a gripping surface with the gripping surfaces adapted to receive a fishing line therebetween to space the gripping surfaces apart and frictionally secure the fishing line therebetween, the movable jaw including a contact member, said switch assembly including a stationary contact member with the movable contact member being spaced from the stationary contact member when the fishing line is between the gripping surfaces to interrupt the circuit to the signal producing means, spring means biasing the movable jaw to fishing line gripping position to bias the movable contact into engagement with the stationary contact when the fishing line is removed from between the gripping surfaces, said spring means including a folded leaf spring having diverging leaf components with one component engaging the movable jaw, and an adjustable screw engaging the other leaf component for varying the spring force exerted on the movable jaw thereby varying the clamping force exerted against the fishing line in order to vary the force required to pull the line from between the gripping surfaces thereby varying the sensitivity of the fishing line signal, said means adjustably mounting the switch assembly including a male component of a jack plug mounted on the switch assembly and inserted into a female component of a jack plug mounted interiorly of the housing supporting the signal producing means, and a stay stud on the switch assembly spaced from the male component of the jack plug, said housing for the signal producing means including a plurality of spaced apertures around the female component of the jack plug to enable the position of the switch assembly to be angularly adjusted about an axis defined by the male component of the jack plug when the stay stud is received in a selected one of said apertures thereby orienting the gripping surfaces in varied positions in relation to the housing to adapt the housing for orientation in any position on a fishing rod and to orient the gripping surfaces to vary the tension force required on the fishing line to remove the fishing line from between the gripping surfaces without varying the adjusting screw for the leaf spring.

2. The structure as defined in claim 1 wherein said means supporting the housing from the fishing rod includes a clamp bracket comprising a pair of clamp jaws having inturned outer ends and flat inner ends, a threaded stud pivotally supporting the jaws adjacent their flat inner ends, said stud being externally threaded, an internally threaded actuating nut on said stud engaging the flat inner ends of the jaws to move the outer ends of the jaws toward each other into encircling and clamping relation to the fishing rod.

3. The structure as defined in claim 2 wherein the outer ends of the jaw are provided with alternating teeth and recesses for interdigitating when in clamped relation.

4. The structure as defined in claim 2 wherein the outer ends of the jaws are provided with straight edge engaging surfaces oriented in adjacent relation when the jaws are in gripping relation to a fishing rod.

5. The structure as defined in claim 2 wherein each of said jaws is provided with a rubber insert on the inner surface thereof for securely and stably engaging a fishing rod when clamped thereon.

6. The structure as defined in claim 5 wherein said stud includes a threaded rod extending internally thereof and into the space between the inner ends of the jaws for engagement with the fishing rod to enable radial adjustment of the threaded rod to accommodate and clampingly engage different sized fishing rods.

7. The structure as defined in claim 6 wherein said housing is mounted on one surface of the fishing rod and used in combination with a reel mounted on the opposite surface of the fishing rod so that the fishing line signal is out of way of operation of the reel in a normal manner.

8. The structure as defined in claim 1 wherein said signal producing means includes a battery powered buzzer and light and a selector switch for selectively activating the buzzer or light or both when the circuit is completed from the switch assembly to the signal producing means.

9. A signal device for use in combination with a fishing line subject to linear movement when a fish strikes or takes the bait or hook attached to the line, said device comprising a housing, battery means in said housing, a visual signal means and an audible signal means on said housing, selector switch means on said housing electrically connected with the battery means and said signal means to actuate either or both of said signal means when an electrical circuit is completed from the battery means to the selector switch means, a switch assembly having fishing line gripping means thereon, means mounting the switch assembly on the housing, said mounting means including contact means to complete an electrical circuit between the battery means and selector switch means in the absence of a fishing line in said fishing line gripping means, said contact means including a male plug member on the switch assembly, a female component on the housing telescopically receiving the male plug and making electrical contact therewith, means releasably retaining the male plug telescoped into the female component to enable removal of the male plug and angular movement of the switch assembly about an axis defined by the center of the male plug, said mounting means also including a locating stud on said switch assembly spaced from the male plug, said housing having a plurality of holes arranged around the female component for receiving said stud to retain the switch assembly in angular adjusted position in relation to the housing for varying the relation between the fishing line gripping means and the fishing line.

10. The signal device as defined in claim 9 wherein said fishing line gripping means includes a switch arm pivotally supported on the switch assembly, adjustable spring means biasing the switch arm toward fishing line gripping position, said contact means also including a contact on the switch arm, a stationary contact on said switch assembly, said contacts being spaced apart when the switch arm is in gripping engagement with a fishing line and movable into engagement to complete a circuit to the selector switch means when the fishing line is removed from engagement by the switch arm.

* * * * *